United States Patent [19]

Trojahn

[11] Patent Number: 4,910,030
[45] Date of Patent: Mar. 20, 1990

[54] FROZEN CONFECTIONARY PRODUCT AND METHOD OF MAKING THE SAME

[76] Inventor: Charles J. Trojahn, 85-23 66th Ave., Forest Hills, N.Y. 11374

[21] Appl. No.: 225,562

[22] Filed: Jul. 25, 1988

Related U.S. Application Data

[63] Continuation of Ser. No. 908,199, Sep. 17, 1986.

[51] Int. Cl.$^4$ ............................ A23G 3/00; A21D 8/00
[52] U.S. Cl. ............................................ 426/94; 426/95; 426/101; 426/283; 426/284; 426/138; 426/139
[58] Field of Search ................. 426/94, 100, 101, 282, 426/283, 284

[56] References Cited

U.S. PATENT DOCUMENTS

| | | | |
|---|---|---|---|
| 1,817,114 | 4/1931 | Valenta | 426/282 |
| 2,564,049 | 8/1951 | Bevington | 426/94 |
| 2,960,045 | 11/1960 | Pentzlin | 426/284 |
| 3,867,559 | 2/1975 | Haas | 426/283 |
| 4,247,567 | 1/1981 | Momiyama | 426/94 |
| 4,275,476 | 6/1981 | Chambers | 426/283 |
| 4,427,703 | 1/1984 | Schafer | 426/284 |
| 4,569,848 | 2/1986 | Giorgetti et al. | 426/284 |

OTHER PUBLICATIONS

Lord, Everybodys Cookbook, Harcourt Brace & Co., New York, 1937, pp. 426–427, 856, 875.
Woman's Day Encyclopedia of Cookery, vol. 6, Fawcett Pub. Inc. New York, 1966, pp. 932–934.
Woman's Day Encyclopedia of Cookery, vol. 12, Fawcett Pub. Inc., New York, 1966, pp. 1914–1915.

*Primary Examiner*—Jeanette Hunter
*Attorney, Agent, or Firm*—Hoffman & Baron

[57] ABSTRACT

A frozen confectionary product including a shell, having two openings at its opposed ends and a longitudinally hollow center. The center of the shell is filled with a frozen product, such as, for instance, ice cream, which is substantially enveloped by the shell.

The product is self-supporting and self-sustained and remains intact during consumption. The method for producing the frozen confectionary product is also provided. The method essentially includes providing a shell, introducing a frozen product into the hollow center of the shell and freezing the shell, while maintaining the frozen texture of the product contained within.

10 Claims, 2 Drawing Sheets

FROZEN CONFECTIONARY PRODUCT AND METHOD OF MAKING THE SAME

This is a continuation of co-pending application Ser. No. 908,199, filed on Sept. 17, 1986.

BACKGROUND OF THE INVENTION

The present invention relates generally to a confectionary product and, more particularly, to frozen confectionary products which can be easily manufactured and delivered, and easily handled by the consumer.

Heretofore a variety of edible food products have been combined with a variety of edible shells, casings or containers which are intended to be consumed simultaneously. In most instances, these edible shells, casings or containers have been fabricated from flour-based products such as pastry shells, etc. While the food within the edible shell can be quite varied, including, hot foods, cold foods and frozen foods, one disadvantage which has become associated with these types of combined products is that the particular food product is not ready for consumption at the time it is purchased. For instance, U.S. Pat. No. 4,447,457 to Bernal discloses a readily portable food item. However, it must be cooked prior to consumption in order to make it edible, as well as palatable. Moreover, since the food item is not self-sustaining it must be held together by a fastener, such as, a toothpick, to prevent it from coming apart.

Analogous to the teachings of the Bernal patent, U.S. Pat. No. 4,275,082, to Dougan discloses a frozen puff pastry and edible insert combination and process which also must be cooked prior to consumption by the person who desires to eat it.

The manufacture of uncombined edible food items are well known. For instance, U.S. Pat. No. 4,247,567 to Momiyama describes a method of making a rice cracker or senbei. The product which is formed by the disclosed process is essentially a cracker which can be manufactured in a variety of shapes. There is no teaching or suggestion of combining the cracker with an additional food item.

Another type of food item of this nature includes a shell, which oftentimes includes a cavity or pocket adapted to be filled with a supplemental food item. As such, the food item must be combined by the consumer himself, or, alteratively, by the vendor of the food item. In any event, such a food item cannot be purchased, or otherwise obtained in it's combined form. Such an arrangement is disclosed in U.S. Pat. No. 4,205,091 to Van Horne, which describes an edible server essentially comprised of a plurality of consecutively associated edible receptacles.

Similarly, U.S. Pat. No. 2,508,724 to Moffett shows a method of making an edible dish. A compatible food item is to be subsequently introduced into the dish, which i ultimately to be consumed in combination with the edible dish.

U.S. Pat. No. 1,854,224 to Rankin, discloses a waffle which has a body portion consisting of two separate halves and which is adapted to receive foodstuffs therein, so that the waffle and subsequently added foodstuff can be consumed simultaneously.

U.S. Pat. No. 1,850,356 to Parr, discloses an edible ice cream container which is adapted to have ice cream introduced therein and which is intended to be consumed in combination. Similarly, an edible ice cream container is disclosed in U.S. Pat. No. 1,637,556 to Denaro.

Finally, U.S. Pat. No. 1,899,511 to Leaf, discloses an ice cream sandwich consisting of a center portion of ice cream and two separate waffle type wafers which constitute the outer portions.

In light of the foregoing, it is not presently known in the art of combined frozen confections to provide a frozen cylindrical product which can be assembled and delivered to the consumer as a self-supporting item capable of consumption entirely without having the product come apart. Moreover, until now one could not rely on the known art of combined frozen confectionary products to provide such a product easily and cost effectively.

Thus, it is an object of the present invention to provide a combined frozen cylindrical confectionary product which is ready for consumption upon purchase.

It is a further object of the present invention to provide a combined frozen confectionary product which can be manufactured and delivered as a unitary item.

It is still a further object of the present invention to provide a combined confectionary product which remains intact while it is being consumed without the aid of any additional device.

It is still another object of the present invention to provide a combined frozen confectionary product which is easily and cost effectively produced.

SUMMARY OF THE INVENTION

The present invention provides a frozen confectionary product, which includes an edible shell having an inner and outer surface and a longitudinally hollow center with an opening at each opposed end. An edible inner filling is disposed within the hollow center, which is supported by the shell. Such an arrangement allows the product to be automatically assembled, packaged for deliver, and readily eaten by the consumer.

The present invention also provides for a method of producing a frozen confectionary product, which includes providing an edible outer shell having an inner and outer surface and a longitudinally hollow center with an opening at each opposed end. An edible filling is introduced into the hollow center, supported, and substantially enveloped by the shell. The shell and filling can then be frozen for further handling and consumption. The product is self-sustained, self-supported and can be consumed entirely while maintaining the integrity of the product.

The shell is preferably a generally circular- or ovoid-shaped planar flour-based cake-like layer which has a surface with a waffle-like relief. Also the layer is preferably formed into the shell by rolling it and overlapping adjacent edges resulting from rolling.

When a preferred formulation of the cake-like layer is prepared, it can be formed into the desired cylinder configuration within 30 seconds of completion of baking, and preferably within 15–20 seconds of baking, without unduly disturbing or distorting the surfaces and integrity of the shell. The preparation parameters of this preferred embodiment include a baking temperature range of from about 425° F. to about 475° F. for from about 30 seconds to about 1 minute, and is preferably at a temperature of about 450° F. for about 45 seconds. The preferred shell layer has a cross-sectional dimension of from about 1/16" to about ⅜", and is preferably from about ⅛" to about ⅜" in thickness.

As a result, a combined frozen confectionary product is provided, as well as a method for producing the frozen confectionary product. The resulting product is self-supporting without the aid of handles, sticks or the like, an ready for consumption when it is purchased.

Advantageously, the instant method results in the formation of a product which can be easily and cost effectively manufactured.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 1a is a cross-sectional view of the shell layer in FIG. 1 taken along lines 1a—1a;

DETAILED DESCRIPTION OF THE INVENTION

Figure 1:
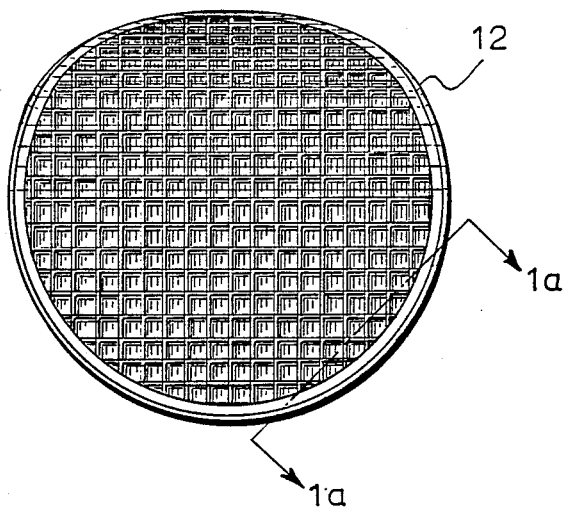
FIG. 1 is a plan view of a substantially flat or unrolled shell in accordance with the present invention illustrating a waffled surface relief.
Figure 1A:
Figure 2:
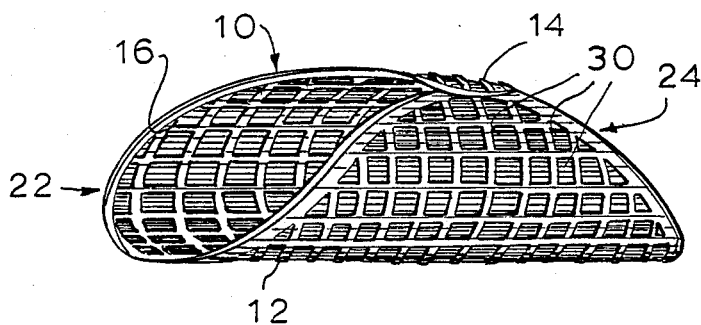
FIG. 2 is a perspective view of a rolled shell in accordance with the present invention.

Referring to the drawings and, in particular, FIGS. 1 and 2, illustrated is a shell 12 in the unrolled (FIG. 1) and its rolled (FIG. 2) condition, respectively. In FIG. 1, the shell layer is shown with one edge turned up to initiate the forming of a cylinder.

Referring now to FIG. 1–FIG. 4, wherein like parts are represented by like reference numerals, there is illustrated a frozen confectionary food product 10 in accordance with the present invention. As illustrated, food product 10 includes shell 12, which has an outer surface 14 and an inner surface 16 and openings 22 and 24 at the opposed ends thereof. Shell 12 is fabricated to be edible and, as illustrated, preferably has a relief on at least its outer surface 14 similar to that of a waffle. In a preferred embodiment the inner surface 16 of shell 12 also has a waffle-like relief as shown in FIG. 2, which enhances appearance and bite and so that the filling can be somewhat restrained upon biting from lengthwise displacement out of the cylinder. The shell 12 can be prepared from ingredients commonly used in the baking art, which include in admixture, egg, flour, sugar, margarine, baking powder and vanilla and/or cocoa. It is to be understood that other ingredients can be used and the concentrations of these ingredients are subject to modifications in order to produce a cake-like product which has a suitable taste and texture and is capable of maintaining a rolled cylindrical shape when properly prepared—even when filled.

In particular, it has been found that a delicious cake-like layer can be prepared with waffle-like surface relief on one or both sides using the following formula.

| Shell Formula | | |
|---|---|---|
| Ingredient | Range % by weight | Preferred |
| Flour | 26.0% to 30.0% | 28.00% |
| Sugar or Sugar Substitute | 28.0% to 32.0% | 31.00% |
| Margarine | 10.0% to 14.0% | 13.00% |
| Baking Powder | 0.5% to 1.0% | 0.75% |
| Egg or Egg Substitute | 16.0% to 20.0% | 19.00% |
| Flavoring (e.g., Vanilla or Cocoa) | 5.0% to 10.0% | 8.25% |

It is noted that when a chocolate shell is prepared some vanilla is also included, whereas when a vanilla shell is prepared no cocoa is used in the formula. Furthermore, the vanilla batters includes only about one-half the amount of sugar used in the above formulations.

The ingredients are mixed in conventional fashion and baked on a waffle grid at a temperature of from about 425° to about 475° F. for from about 30 seconds to about 1 minute until the layer of shell is a golden brown. When the layer is baked precisely at 450° for 45 seconds, a shell can be readily formed by rolling the layer and slightly overlapping and pressing the adjacent edges while still slightly warm. The layer must be rolled and overlapped in this embodiment within no more than about 30 seconds upon removal from baking, and preferably 15 to 20 seconds in order to provide an attractive permanent cylinder configuration which will maintain its integrity and which does not have a surface disrupted from rolling. In this way a permanent self-supporting shell is formed for handling and introduction of a frozen confection filling.

Figure 3:
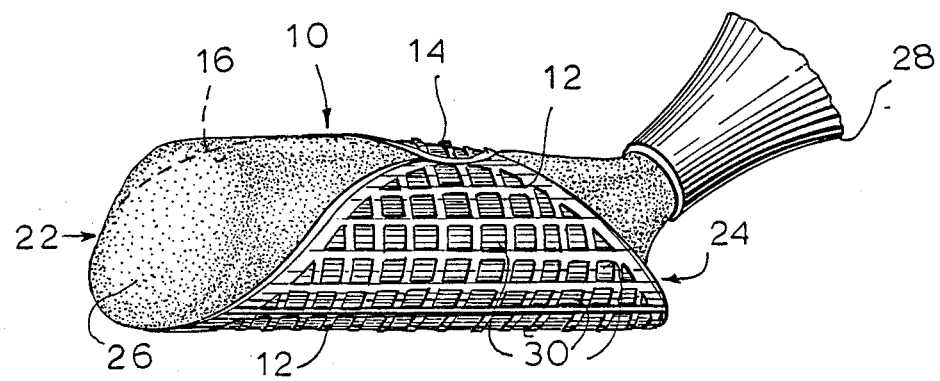
FIG. 3 is a perspective view of the shell of FIG. 2, which illustrates the introduction of the filling into the hollow center portion.
Figure 4:
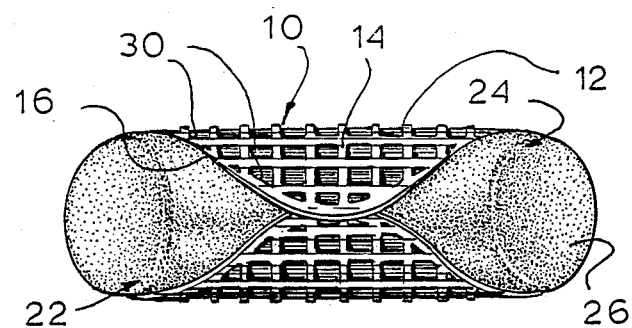
FIG. 4 is a plan view of the entire composite, i.e., the shell of FIG. 2, and the inner filling in frozen condition ready for the consumer, illustrating an overlapping relationship.

Referring now to FIGS. 3 and 4, it will be seen that the frozen confectionary product 10 includes an edible filling 26 disposed within the hollow center of shell 12. Filling 26 can include ingredients such as ice cream, ice milk, sherbet, sorbet, tofu, toffutti, yogurt, custard and the like. As a preferred embodiment, inner filling 26 is an ice cream of any flavor, preferably prepared from all natural ingredients such as fresh cream, skim or whole milk, cane sugar, egg yolk, natural vanilla and the like.

Inner filling 26 is supported, and substantially enveloped by, shell 12. The entire composite, i.e., the outer shell and inner filling, can thereafter be frozen to provide a product which is self-sustaining, self-supported and which can be consumed entirely, while maintaining the integrity of the product.

The present invention also provides for a method of producing a frozen confectionary product. Shell 12 can be rolled as indicated above to form a cylindrical shell configuration. Thus, the cake layer is formed into a shell rolled, so as to overlap the adjacent edges to define a longitudinally hollow center with openings at opposed ends. When the layer is generally circular or ovoid in shape, the openings have edges which are tapered from the end to the center of the cylinder as shown in the FIGURES. While other configurations can be used, such as a square layer which rolls into a solid cylinder, the tapered configuration has been found to be particularly appealing to the consumer and provides an organoleptically pleasing bite-through.

After shell 12 is formed, inner filling 26 is introduced into the hollow center of shell 12, as illustrated in FIG. 3. Still referring to FIG. 3, it will be seen that inner filling 26 can be introduced, for example, into shell 12 by use of bakers spout 28. While any equipment which is suitable for introducing the inner filler may be used, it has been found that equipment which holds filling at from about 15° to about 20° F. is particularly suitable for natural ice cream, when it is introduced into shell 12 by means of, for example, an air pump at a pressure of about 30 psi.

Figure 5:
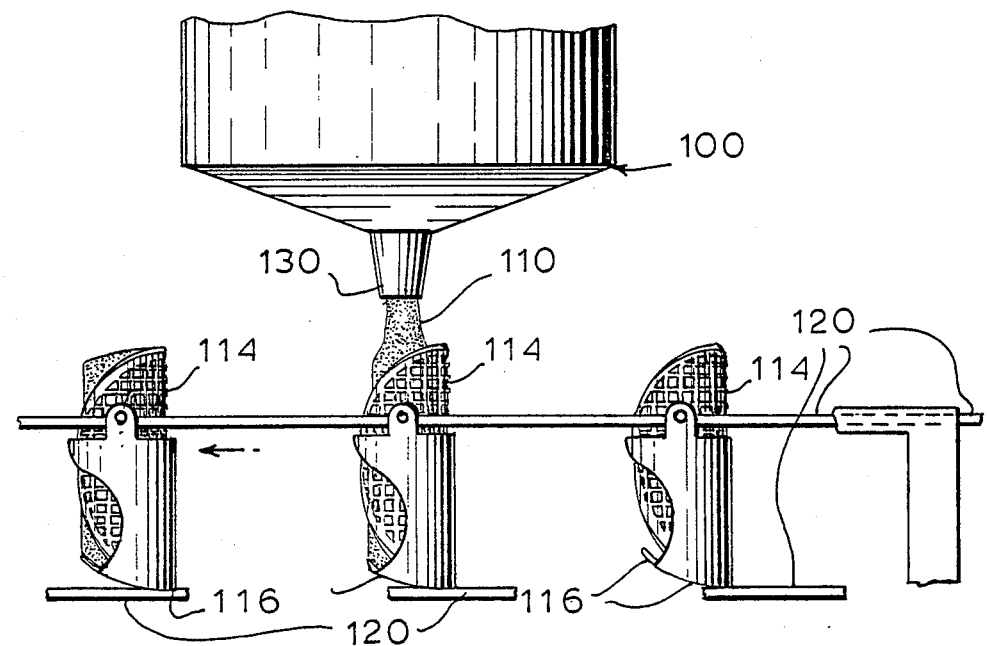
FIG. 5 depicts a method and apparatus for filling the novelty ice cream product of the present invention.

One method contemplated for filling the rolled cylinders on a production scale in accordance with the present invention is depicted in FIG. 5, wherein an ice cream maker/freezer/pump 100 maintains a frozen confectionary product 110 as described above in a plastic or semi-plastic condition for delivery under pressure to individual cylindrical shells 114. In order to provide continuous production, the shells 114 can be placed in holders 116 fixed on a production belt 120, which is timed for conveying the shells intermittently between filling operations. Consequently, the belt 120 provides a stop for the flow of filling material 110. The filling is preferably introduced into the shells through a nozzle 13 having a receiving diameter of from about ¾" to about 1 ½", preferably about 1", and an exit orifice of from about ½" to about 1", and preferably about ¾". The nozzle can be from about 1" to about 3" in length, and is preferably about 2" in length. A preferred material for nozzle construction is stainless steel because of its acceptance in food handling requirements.

After inner filing 26 has been introduced into the hollow center portion of shell 12, the entire food product 10, can be subjected to a temperature, such as from about −30° to about −15° F., which will freeze th composite, i.e., shell 12 and inner filling 26, sufficiently for subsequent handling, delivery, storage, and sales.

In accordance with the foregoing arrangement, food product 10 is ready for consumption when it is purchased. Moreover, a preferred design for shell 12, includes a plurality of indentures 30 in the waffle-like texture, having a square-shaped or diamond configuration as seen in FIGS. 1–3, although other type designs such as circular and the like can be employed.

Thus, while there has been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A frozen confectionary product which comprises:
    a discrete permanent baked shell configured to sustain cylindrical integrity and having an inner and outer surface and a longitudinally hollow center with an opening at each opposed end, wherein said shell is made from a mixture of egg, flour, sugar, margarine, baking powder and, vanilla or cocoa baked at temperature of from about 425° to about 475° F. for about 30 seconds to about 1 minute and rolled within 30 seconds upon removal from baking an pressing slightly overlap adjacent edges while warm to provide said cylinder; and
    an edible frozen filling disposed within said hollow center, said filling being supported and substantially enveloped by said shell provided by pumping said filling into said shell at a temperature of from about 15° to about 20° F. and freezing said filled shell at a temperature of from about −30° to about −15° F.
said edible frozen filling selected from the group consisting of ice cream sherbet, ice milk, sorbet, tofu, toffutti, yogurt, and custard.

2. The product of claim 1, wherein said flour is present in an amount of from about 26% to about 30% based on the total weight of said edible shell, and said sugar is present in an amount of from about 28% to about 32% based on the total weight of said edible shell.

3. The product of claim 1 wherein said outer surface of said edible shell has waffle-like relief.

4. The product of claim 1 wherein said inner surface of said shell has a waffle-like relief.

5. The product of claim 1, wherein said longitudinally hollow center is formed by baking said edible outer shell to a temperature range of between 425° F. and 475° F., for a time of at least about 30 seconds and not exceeding 1 minute and, thereafter, rolling said edible outer shell so that adjacent edges thereof are arranged in overlapping relation.

6. A method for producing a frozen confectionary product which comprises:
    providing a discrete supple cake-like baked shell having an inner and outer surface and a longitudinally hollow center with an opening at each opposed end by admixing ingredients selected from the group consisting of flour, a sweetener, margarine, baking powder, eggs and a flavoring and, thereafter, baking the resultant admixture at a temperature from about 425° to about 475° F., for a period of about 30 seconds to about 1 minute;
    rolling said discrete shell at a time of about 12 seconds to about 30 seconds after baking so that adjacent edges thereof are arranged in overlapping relation to form said longitudinally hollow center; and
    introducing an edible filling within said hollow center, such that said filling is supported and substantially enveloped by said shell.

7. The method of claim 6 wherein said composite shell and filling is frozen so that said product is self-sustained, self-supported and can be consumed entirely while maintaining the integrity of said product.

8. The method of claim 7 wherein said edible shell is rolled between about 15 to 20 seconds after baking.

9. A frozen confectionary product prepared by the method comprising:
    providing a discrete supple cake-like baked shell having an inner add outer surface and a longitudinally hollow center with an opening at each opposed end by admixing ingredients selected from the group consisting of flour, a sweetener, margarine, baking powder, eggs and a flavoring and, thereafter, baking the resultant admixture at a temperature from about 425° to about 475° F., for a period of about 30 seconds to about 1 minute;
    rolling said discrete shell at a time of about 12 seconds to about 30 seconds after baking so that adjacent edges thereof are arranged in overlapping relation to form said longitudinally hollow center;
    introducing an edible filling within said hollow center, such that said filling is supported and substantially enveloped by said discrete shell; and
    freezing said supple cake-like baked shell and said discrete edible filling so that the frozen confectionary product can be handled, packaged and ready for consumption when purchased by a consumer.

10. The frozen confectionary product of claim 9 wherein said discrete supple cake-like baked shell and said edible filling are frozen by being subjected to temperatures from about −30° to about −15° F.

* * * * *